(12) United States Patent
Molyneaux et al.

(10) Patent No.: US 9,704,295 B2
(45) Date of Patent: Jul. 11, 2017

(54) CONSTRUCTION OF SYNTHETIC AUGMENTED REALITY ENVIRONMENT

(71) Applicant: MICROSOFT TECHNOLOGY LICENSING, LLC, Redmond, WA (US)

(72) Inventors: Dave Molyneaux, Kirkland, WA (US); Christopher White, Seattle, WA (US); Anson Tsao, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 168 days.

(21) Appl. No.: 14/072,708

(22) Filed: Nov. 5, 2013

(65) Prior Publication Data

US 2015/0123965 A1    May 7, 2015

(51) Int. Cl.
  *G06T 17/00*    (2006.01)
  *G06T 19/00*    (2011.01)
  (Continued)

(52) U.S. Cl.
  CPC .......... *G06T 19/006* (2013.01); *G06T 15/005* (2013.01); *G06T 17/00* (2013.01); *G06T 19/20* (2013.01); *G06T 2219/2021* (2013.01)

(58) Field of Classification Search
  None
  See application file for complete search history.

(56) References Cited

U.S. PATENT DOCUMENTS 8,401,225 B2  3/2013  Newcombe et al.
8,401,242 B2  3/2013  Newcombe et al.
(Continued)

FOREIGN PATENT DOCUMENTS

| EP | 2437220 A1 | 4/2012 |
| WO | 2013033442 A1 | 3/2013 |
| WO | 2013082009 A1 | 6/2013 |

OTHER PUBLICATIONS

Izadi, Shahram et al., "KinectFusion: Real-time 3D Reconstruction and Interaction Using a Moving Depth Camera," Proceedings of the 24th Annual ACM Symposium on User Interface Software and Technology, Oct. 2011, 10 pages.*

(Continued)

*Primary Examiner* — Jacinta M Crawford
*Assistant Examiner* — Diane Wills
(74) *Attorney, Agent, or Firm* — Alleman Hall Creasman & Tuttle LLP

(57) ABSTRACT

Embodiments are disclosed that relate to producing a synthetic environmental model derived from a three dimensional representation of an environment, and rendering images from the model. For example, one disclosed embodiment provides a method including detecting a trigger to build the synthetic environmental model utilizing the three dimensional representation of the environment, and, in response to the trigger, obtaining a set of synthetic image elements for use in constructing the synthetic environmental model. The method further includes fitting one or more elements from the set of synthetic image elements to the three dimensional representation of the environment according to a set of rules to produce the synthetic environmental model, and rendering an image from the synthetic environmental model for display, the image showing the one or more elements from the set of synthetic image elements replacing real-world topography in the environment.

19 Claims, 5 Drawing Sheets

(51) Int. Cl.
*G06T 15/00* (2011.01)
*G06T 19/20* (2011.01)

(56) References Cited

U.S. PATENT DOCUMENTS

| | | | | |
|---|---|---|---|---|
| 2010/0277489 | A1* | 11/2010 | Geisner | G06F 3/011 |
| | | | | 345/581 |
| 2010/0278393 | A1* | 11/2010 | Snook | G06F 3/011 |
| | | | | 382/107 |
| 2011/0202510 | A1* | 8/2011 | Salemann | G06T 17/05 |
| | | | | 707/693 |
| 2012/0223943 | A1 | 9/2012 | Williams et al. | |
| 2012/0264510 | A1* | 10/2012 | Wigdor | A63F 13/10 |
| | | | | 463/31 |
| 2013/0004060 | A1* | 1/2013 | Bell | G06T 19/20 |
| | | | | 382/154 |
| 2013/0117377 | A1* | 5/2013 | Miller | H04L 67/38 |
| | | | | 709/205 |
| 2013/0187905 | A1* | 7/2013 | Vaddadi | G06T 15/205 |
| | | | | 345/419 |
| 2014/0002493 | A1* | 1/2014 | Mitchell | G06T 13/20 |
| | | | | 345/633 |
| 2014/0292645 | A1* | 10/2014 | Tsurumi | G06F 3/011 |
| | | | | 345/156 |
| 2014/0321702 | A1* | 10/2014 | Schmalstieg | G06K 9/00624 |
| | | | | 382/103 |

OTHER PUBLICATIONS

ISA European Patent Office, International Search Report and Written opinion Issued in PCT Patent Application No. PCT/US2014/063766, Jan. 26, 2015, 10 Pages.

Höllerer, Tobias et al., "'Anywhere Augmentation': Towards Mobile Augmented Reality in Unprepared Environments," Location Based Services and TeleCartography, Series: Lecture Notes in Geoinformation and Cartography, Feb. 2007, pp. 393-416.

IPEA European Patent Office, Second Written Opinion Issued in Application No. PCT/US2014/063766, Sep. 29, 2015, WIPO, 6 pages.

IPEA European Patent Office, International Preliminary Report on Patentability Issued in Application No. PCT/US2014/063766, Feb. 9, 2016, WIPO, 7 pages.

\* cited by examiner

CONSTRUCTION OF SYNTHETIC AUGMENTED REALITY ENVIRONMENT

BACKGROUND

Augmented reality systems may be configured to capture an image of a real-world environment, and to render a synthetic image comprising virtual objects displayed as an overlay over at least a portion of the real-world image. In this way, virtual objects may be added to a real-world image to provide an augmented view of the real-world.

SUMMARY

Embodiments are disclosed that relate to producing a synthetic environmental model derived from a three dimensional representation of an environment, and rendering images from the model. For example, one disclosed embodiment provides a method comprising detecting a trigger to build the synthetic environmental model utilizing the three dimensional representation of the environment, and, in response to the trigger, obtaining a set of synthetic image elements for use in constructing the synthetic environmental model. The method further comprises fitting one or more elements from the set of synthetic image elements to the three dimensional representation of the environment according to a set of rules to produce the synthetic environmental model, and rendering an image from the synthetic environmental model for display, the image comprising the one or more elements from the set of synthetic image elements replacing real-world elements in the three dimensional representation of the environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments are disclosed that relate to generating a synthetic environmental model based upon an observed real-world environment, wherein elements in a three dimensional representation of the real-world environment are replaced with synthetic image element (e.g. a three-dimensional graphical model) in the synthetic environmental model. In an augmented reality image rendered from such a synthetic environmental model, the synthetic elements replace real-world elements, rather than being represented as an overlay over the real-world elements. Thus, the use of such a synthetic environmental model may help to simplify rendering compared to the rendering of an overlay for a real-world image, as the rendering of both the real-world image and the overlay may result in the rendering of redundant data in the real-world image that is obscured by the overlay.

Figure 1:
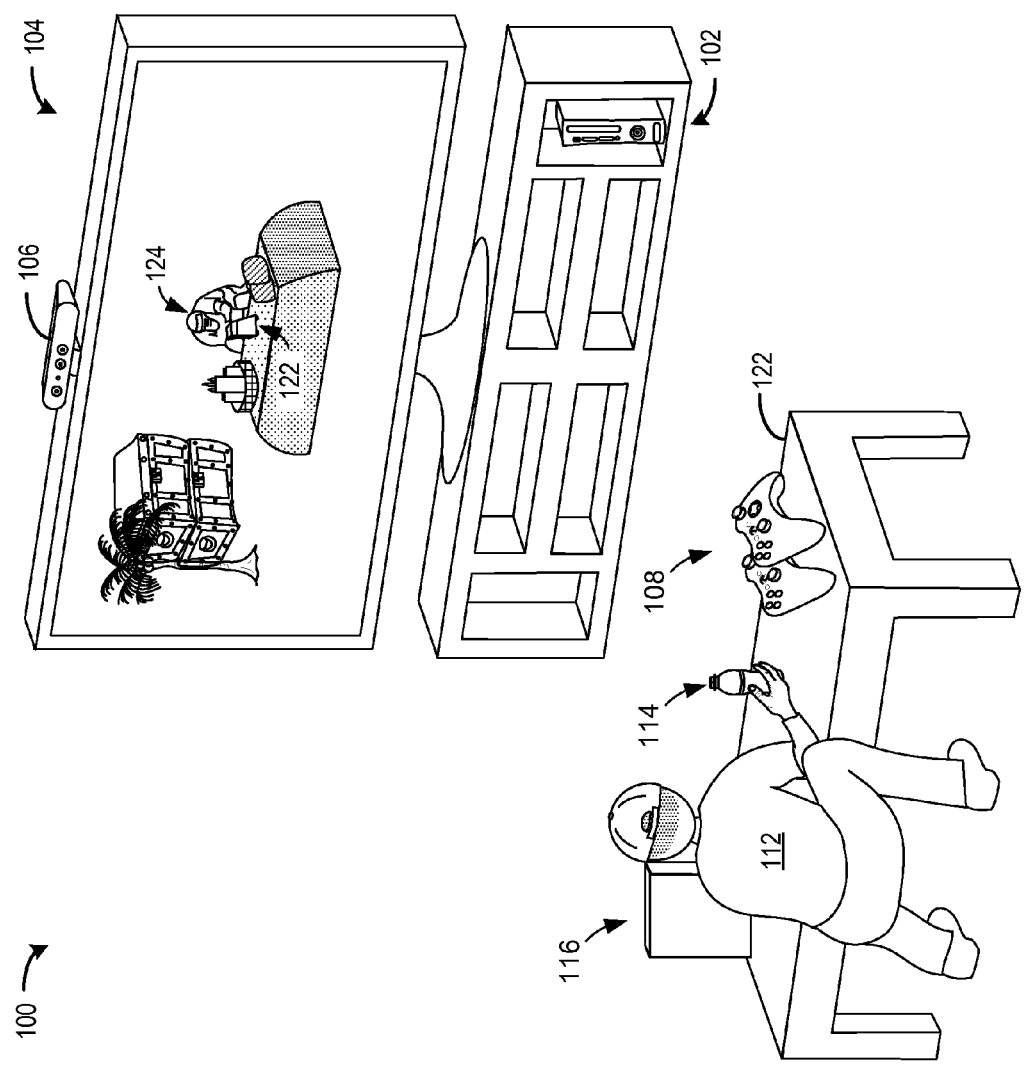
FIG. 1 shows an example rendering of a synthetic environmental model in accordance with an embodiment of the present disclosure.

FIG. 1 shows a non-limiting example use environment 100 comprising a computing device 102 communicatively connected to a display device 104 and a sensor system 106. Although environment 100 is illustrated as a room, a use environment may be any suitable physical space, including indoor and/or outdoor environments. Computing device 102 may be used to play a variety of different games, play one or more different media types, and/or control or manipulate non-game applications and/or operating systems. Computing device 102 may receive input from one or more control devices 108, which may include any suitable control device, such as game controllers, remote controls, mobile computing devices, etc.

Sensor system 106 may include a visible light camera (e.g., an RGB camera), a stereo or array camera system, and/or a depth camera (e.g., time-of-flight and/or structured light depth camera). For example, sensor system 106 may include one or more sensors, lens elements, and/or light sources that are configured to image environment 100. Depth images captured by a depth camera may indicate a depth of a surface imaged by each pixel in order to provide information regarding one or more features of environment 100. Sensor system 106 may comprise additional sensors, including but not limited to one or more microphones (e.g., a directional microphone array). Sensor system 106 may generate and send images to computing device 102 via one or more interfaces via any suitable wired or wireless data connection.

The computing device 102 may receive depth data and/or other information (e.g. RGB image data) describing the environment 100 that captures people, surfaces, objects, and/or other elements that form the real-world topography of environment 100. Image data capturing these real-world elements can be used to generate a three dimensional representation of environment 100. Referring to FIG. 1, environment 100 includes such elements as a user 112 interacting with a bottle 114, control devices 108, book 116, and furniture items such as a table 118, a bookcase, and a coat rack.

Although a single sensor system 106 is illustrated in FIG. 1, it is to be understood that one or more additional cameras may be included in the environment. In such embodiments, each camera may image the environment from a different perspective than the other camera(s). Further, one or more of the cameras may be movable in any of six degrees of freedom (e.g., translation along and rotation about three perpendicular axes) to capture images of the environment from different perspectives over time. For example, a camera integrated into a mobile device, such as a smart phone, tablet, or laptop, may be moved by a user to capture images of the environment from multiple perspectives. Likewise, a user may carry sensor system 106 around the room while sensor system 106 is acquiring image data to thereby scan the room.

Based upon image data acquired by sensor system 106, the computing device 102 may generate a three dimensional representation of the real-world environment from all of the perspectives captured by sensor system 106. The three dimensional representation may take any suitable form, including but not limited to point cloud and/or mesh representations. From such representations, the computing device 102 may then build a synthetic environmental model by replacing voxel spaces of the three dimensional representation of the real-world environment with synthetic image elements according to a set of rules (e.g. global rules, user-specified rules, and/or rules associated with a specific set of synthetic image elements).

In some embodiments, the replacement of elements in the real-world representation with synthetic elements may be interactive, in that a user may specify a selected synthetic element to be used to replace a selected real-world object. As a more specific example, a user may indicate a real-world object (e.g. a table), for example by pointing at the object, and then may indicate a synthetic image element (e.g. a mountain) to be used to replace the real-world element. The user may perform these inputs in any suitable manner, including but not limited to by voice command, gesture (e.g., pointing at a real-world object or location in the environment or a synthetic image element displayed on a screen), game controller or other physical actuator, touch screen, etc. to select an element from a list, search for an element, browse elements, or otherwise specify elements to define the user-specified rules.

The resulting synthetic environmental model may then be rendered for display on the display device 104 as augmented reality presentation. Further, as the view of sensor system 106 changes (e.g. objects/people move in the real-world environment, and/or sensor system 106 is moved in the real-world environment), corresponding changes may be made in the rendered augmented reality images, such that synthetic image elements corresponding to real-world objects appear to track the movement of the corresponding real-world objects.

Any suitable synthetic image elements may be used to replace objects in the three dimensional real-world representation. In the example of FIG. 1, the computing device 102 replaces the three dimensional representation of the bottle 114 with a synthetic image element of a siege engine 122. Further, the book 116 is replaced by a synthetic image of a castle, the bookcase and coat rack are respectively replaced by a stack of treasure chests and a tree, and the user 112 is replaced by an avatar 124. Additionally, the control devices 108 are replaced by a pair of rocks, and the table 118 is replaced with a geological or topographical feature. These specific synthetic image elements may correspond to a set of synthetic image elements for a specific game, game title, etc., or may not be associated with any specific program. As such, different sets of synthetic image elements and corresponding rules for using the synthetic image elements may be used for different augmented reality presentations. It is to be understood that the example of FIG. 1 is shown for the purpose of illustration and is not intended to be limiting, and that any suitable object in a three dimensional model of an environment may be replaced with any suitable synthetic image element(s). Further, at least portions of an augmented reality image may be rendered without being replaced with a synthetic image element, but instead with image data of the environment acquired by a RGB camera.

Figure 2:
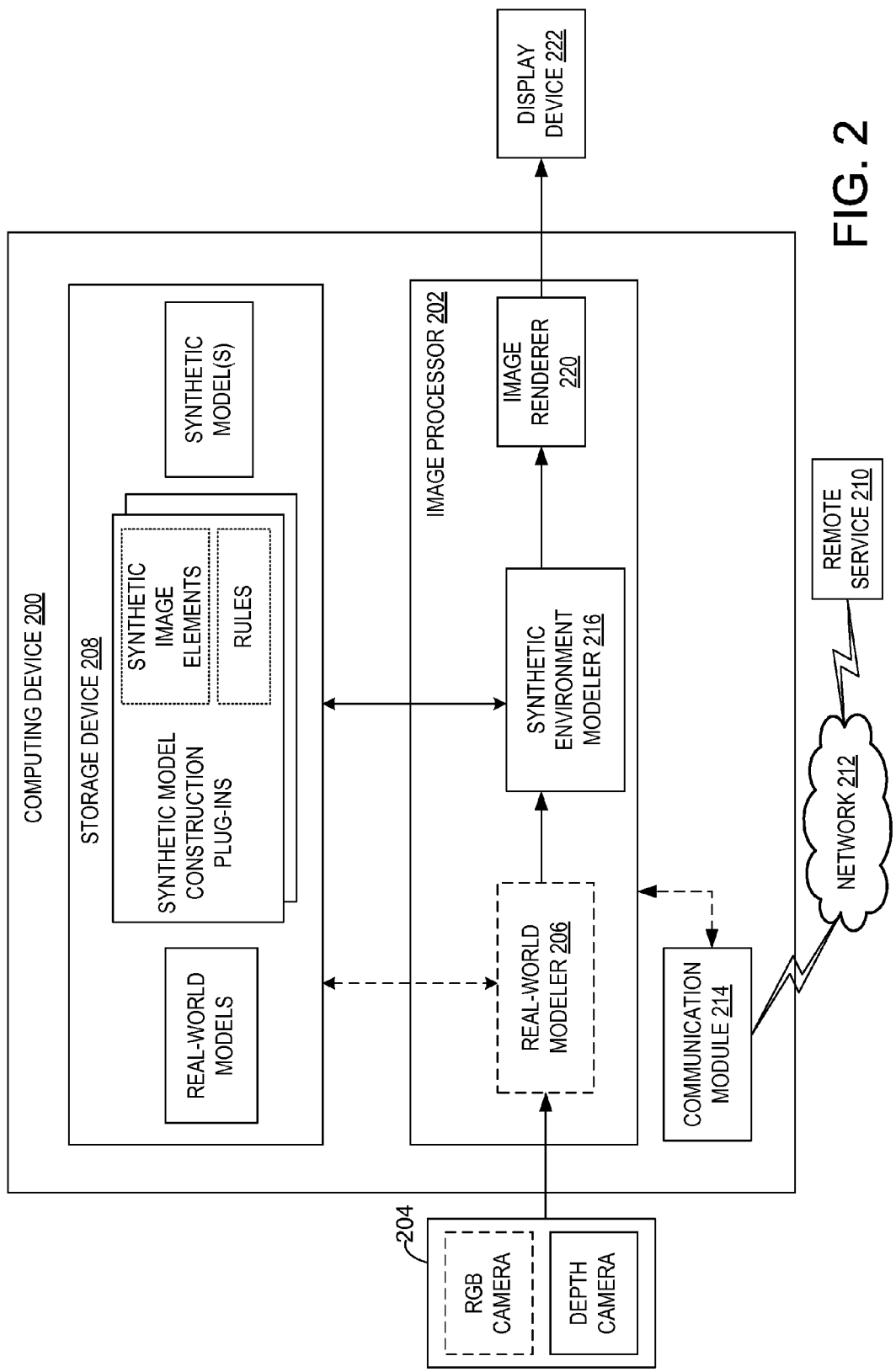
FIG. 2 shows a block diagram of a system for producing a synthetic environmental model derived from a three dimensional representation of an environment in accordance with an embodiment of the present disclosure.

FIG. 2 shows a block diagram of a computing device 200 in accordance with an embodiment of the present disclosure, and illustrates an embodiment of a system for forming and/or rendering synthetic environmental models. Computing device 200 include an image processor 202 for generating and rendering a synthetic environmental model derived from a three dimensional representation of an environment. FIG. 2 also shows a camera system 204 comprising a depth camera configured to capture depth images of the real-world environment. The camera system also may comprise an RBG camera in some embodiments.

In the embodiment of FIG. 2, images from the camera system may be processed via a real-world modeler 206 to generate a three dimensional representation of the real-world environment. The three dimensional representation may comprise a point cloud representation of the environment, a mesh representation of the environment, and/or any other suitable representation of the environment based upon depth data acquired from various perspectives within the environment. Once a three dimensional representation of the real-world environment has been formed, it may be stored (e.g. as depicted as "real world models" on storage device 208) for use in future renderings of augmented reality images of the environment.

The three dimensional representation of the real-world environment may be provided to a synthetic environment modeler 216 for the generation of a synthetic environmental model based on the real-world environment. The synthetic environment modeler 216 may utilize any suitable information to generate the real-world model. For example, the synthetic environment modeler 216 may receive a set of synthetic model generation information (e.g. from storage device 208), wherein the set of synthetic image generation information may include a set of synthetic image elements and also a corresponding set of rules for replacing features in the three dimensional representation of the real-world environment with synthetic image elements. In some embodiments, the synthetic model information may take the form of plug-ins, for example that can be added when new or updated augmented reality programs are obtained by the computing device 200, and/or may take any other suitable form.

The rules may specify, for example, which synthetic image elements are to be used to replace which real-world elements in the three dimensional real-world representation, e.g., based upon real world element identification (e.g., drink bottle, person, etc.), based upon object size, and/or based upon any other suitable factors. Further, as described below with reference to FIG. 4, the rules may specify how to assemble smaller synthetic elements into an extended structure. In addition to the rules that are incorporated in the synthetic model information, other rules may be stored separately from any set of synthetic image elements and applied more globally. In some embodiments, rules also may be set by a user. Real-world models and/or synthetic model construction information also may be obtained from a remote location, such as a remote service 210, via a network 212.

The synthetic environmental model produced by the synthetic environment modeler 216 may be sent to the image renderer 220 to render a displayable image for display on a display device 222. Further, the synthetic environmental model may be stored (e.g. via storage device 208 and/or remotely) for later use. The image renderer 220 may produce an image showing the one or more elements from the set of synthetic image elements replacing real-world topography in the environment as imaged by the camera at the current perspective of the camera. For example, the image renderer 220 may compare depth image information received in real time from the camera with depth image information associated with a real-world environmental model to determine a current orientation and location of the camera. The view of the camera may be determined based on the orientation and location information in order to align the synthetic environmental model with the acquired depth data.

Referring to the example embodiment of FIG. 1, the rules may specify that a specific synthetic image element, such as siege engine 122 of FIG. 1, always replaces a bottle, such as bottle 114 of FIG. 1, in a specified orientation. Such a rule may be user set, or may be pre-set. Accordingly, when a bottle is imaged by the depth camera (e.g., identified based on a comparison of the depth data with an object database describing object models for previously scanned objects and/or objects with known characteristics), the rules may be used to instruct the synthetic modeler to fit synthetic image element(s) corresponding to the siege engine to a voxel space presently occupied by the bottle (e.g. by replacing a real-world feature at a voxel to be rendered with a synthetic element). Upon rendering one or more voxels to form a displayable image, an augmented image such as the image shown on display device 104 of FIG. 1 may be displayed, such that the siege engine replaces the bottle in the image. Thus, as opposed to overlay methods, the bottle is not rendered, and the siege engine is not rendered as a separate layer to be shown over the bottle.

Figure 3:
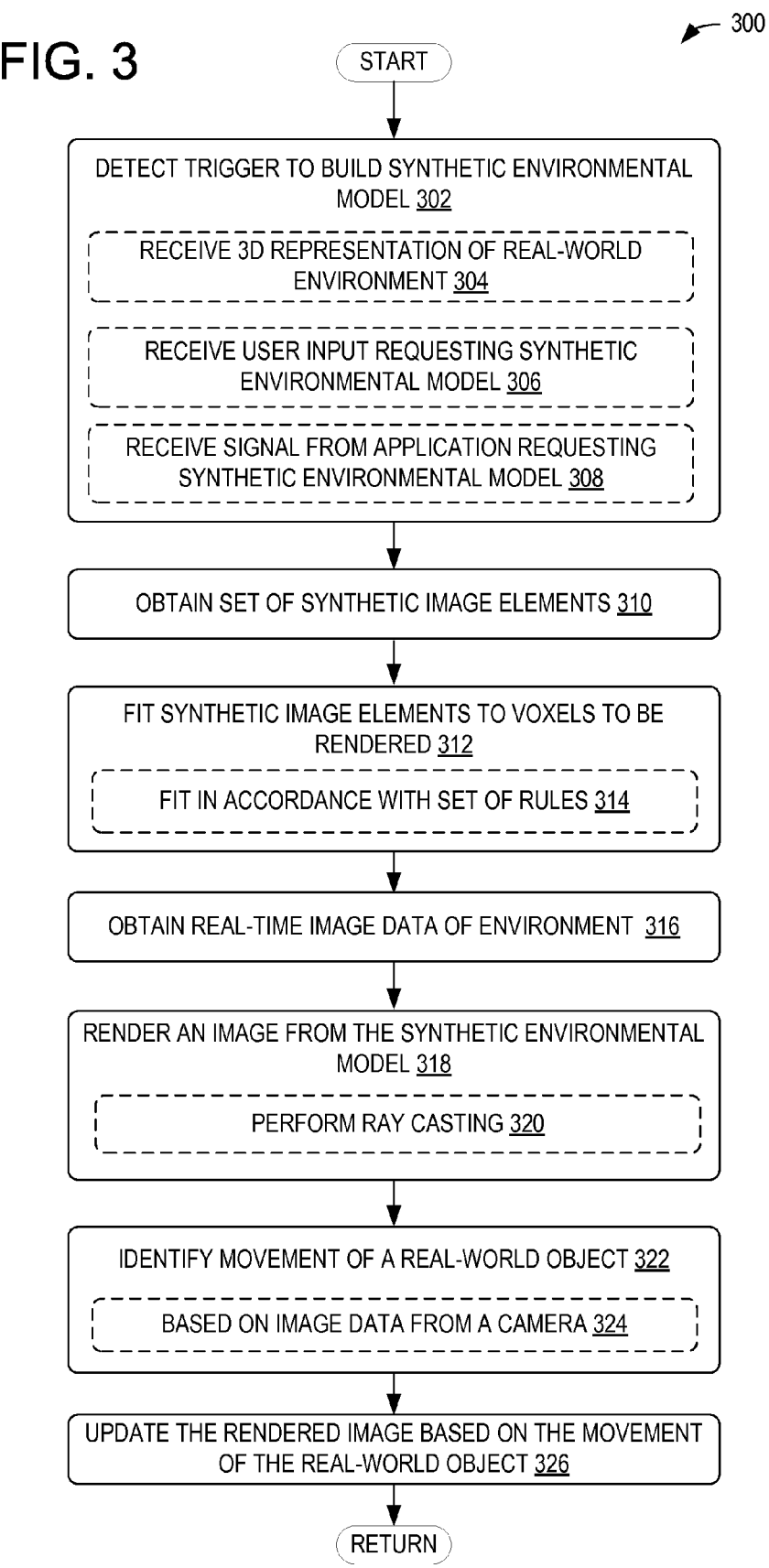
FIG. 3 is a flow chart depicting a method of producing a synthetic environmental model derived from a three dimensional representation of an environment in accordance with an embodiment of the present disclosure.

FIG. 3 is a flow chart depicting an embodiment of a method 300 for producing a synthetic environmental model from a three dimensional representation of a real-world environment and for rendering images based upon the model. Method 300 may be performed by any suitable computing device, including but not limited to those depicted in FIGS. 1-2. Example computing devices are described in further detail below.

Method 300 comprises, at 302, detecting a trigger to build a synthetic environmental model. Any suitable trigger may be used to trigger the building of a synthetic environmental model. For example, the trigger may include receiving a three dimensional representation of a real-world environment from a real-world modeler, as indicated at 304. Such a trigger may be used, for example, when performing and/or responsive to detecting completion of a scan of the real-world environment with a depth camera, and the trigger may comprise a message that the scanning operation and associated processing have been completed. As described above, scanning the real-world environment may include capturing one or more image from one or more perspectives with one or more cameras, and may include scanning with multiple cameras each having a different view (e.g. different perspective) from others. During the scan, camera movement may be tracked in one or more of six degrees of freedom of movement to determine a pose (e.g., a location and orientation) of the camera.

In other instances, the trigger may comprise receipt of a user input requesting to construct a synthetic environmental model, as indicated at 306. For example, a user wishing to build a customized synthetic environment may provide input defining parameters for the model generation, such as synthetic image elements to be utilized, rules for applying synthetic image elements to a three dimensional representation of a real-world environment, selection of a three dimensional representation of the real-world environment, and other such information. The term "set" comprises any collection of one or more synthetic image elements, and may be pre-defined or defined as a user selects individual elements for use.

In yet other instances, detecting the trigger may include receiving a request from an application for construction of the synthetic environmental model, as indicated at 308. For example, upon starting an application, such as an augmented reality video gaming application, the application may request the construction of a synthetic environmental model in order to utilize an augmented reality image as an interactive game space. Where the trigger comprises a user input or request from an application, a previously-generated three dimensional representation of the real-world environment may be used to form the synthetic environmental model, or a user may be requested to perform a scan of the environment to build the three dimensional representation of the real-world environment prior to forming the synthetic environmental model.

At 310, method 300 includes obtaining a set of synthetic image elements. The set of synthetic image elements may be selected based on a user input specifying the set of synthetic image elements, based upon an identity of a program (e.g. a gaming application) that utilizes the set of synthetic elements, based upon the observed real-world environment (e.g., based upon the identities of objects within the real-world environment), or may be selected in any other suitable manner.

Next, at 312, method 300 includes fitting the synthetic image elements to voxel spaces representing real-world elements that are to be replaced with synthetic elements. Such voxel spaces may be identified by using identification functions (e.g. classifiers) to identify objects in the three dimensional representation of the real-world environment. The fitting of the synthetic image elements may be performed in accordance with a set of rules, as indicated at 314, which may be predefined and/or set by a user. For example, a user may specify a real-world object to be replaced and/or also one or more synthetic image elements to use to replace the real-world object. Predefined rules may then be used to perform the actual fitting process (e.g. by utilizing rules specifying which synthetic image elements are to be fit to which portions of real-world objects, in which orientation, adjacent to which other synthetic elements, etc.). The fitting of the synthetic image elements also may involve such processes as rotating, scaling, etc. of the synthetic image elements.

As a more specific example, a user may specify the real-world object to be replaced via a gesture input (e.g. pointing at a bottle) and then designate via speech input which synthetic element will replace the object (e.g. "siege engine"). The input may be detected by a combination of gesture recognition and speech identification. This user-defined rule may then be applied in future renderings of the synthetic model so that the bottle is rendered as a siege engine, and other rules may specify details regarding how to fit the siege engine synthetic element to the bottle.

In this manner, the synthetic environmental model is produced by replacing voxels in the real-world representation with synthetic image elements fit to voxel spaces comprising those voxels. It will be understood that, if some voxels are not replaced with synthetic image elements, then image data acquired via a camera (e.g. an RGB camera) imaging the real-world environment may be fit to those voxels to produce an augmented reality image comprising both real-world imagery and virtual image elements.

Continuing, method 300 includes, at 316, obtaining real-time image data of the environment, for example, via an RGB camera and/or a depth camera. The image data may be compared to the real-world environmental model and/or the synthetic environmental model to determine an orientation and location of the camera. Method 300 then includes rendering a displayable image from the synthetic environmental model, as indicated at 318. Rendering a displayable image may include performing one or more image processing routines on the image elements of the synthetic environmental model to create a two-dimensional image for display on a display device. For example, the two-dimensional image may be generated by performing ray-casting, as indicated at 320. In ray casting, for each pixel of the two-dimensional image being rendered, a ray may be cast through the voxels of the synthetic image model from the perspective of the camera providing the real-time image data. The first surface in the synthetic environmental model intersected by each ray may define the surface to be rendered for embodiments in which the first surface is defined as being opaque, and synthetic image elements at these locations may be rendered in place of real-world data at those locations, instead of as an overlay. In some instances, a surface intersected by a ray may be defined as being at least partially transparent. In such instances one or more surfaces behind that surface also may be rendered with synthetic image elements. Likewise, real-world images acquired by an RGB camera may be displayed for any voxels without synthetic image elements. Rendering a displayable image may include adjusting image data for one or more voxels by performing shading, texturing, reflection, projection, and/or any other suitable image processing routine to produce the two dimensional image.

The synthetic image elements in the image replace real-world topography in the rendered image of the environment, as mentioned above. This may allow the rendering of an overlay image to be omitted, which may help to avoid redundant rendering that occurs in the rendering of overlay images.

Images rendered from the synthetic environmental model may be updated in real time as a user interacts with an augmented reality experience. Thus, as indicated at 322, method 300 may include identifying movement of a real-world object via image data acquired via a camera communicatively coupled to the computing device, as indicated at 324, and updating the rendered image based on the movement of the real-world object, as indicated in 326. For example, updating the rendered view of the image may include adjusting a position of a synthetic image element to align the element with a new position of a corresponding real-world object. Referring to the example illustrated in FIG. 1, movement of the bottle 114 by the user 112 may trigger an update of the image displayed on display device 104 to show the siege engine 122 in an updated position. As a more specific example, a movement of the bottle 114 in a direction toward the bookcase and coat rack in the real-world environment may result in an equal or proportional amount of movement of the siege engine 122 toward the treasure chests and tree in the displayable image.

In some instances, a displayed speed of the movement of the synthetic image element may be based on the speed of the movement of the real-world object and/or a predefined speed limit provided by an application presenting the augmented reality experience (e.g., a video game). For example, the synthetic image element associated with the bottle 114 (e.g., a siege engine) may have an associated maximum and/or minimum speed. Responsive to movement of the bottle 114, an animation of the siege engine 122 moving from an original position to the updated position may present the adjustment at a speed that is equal to, proportional to, or otherwise based upon the speed of movement of the bottle 114 in the real-world environment. If the speed of the movement of the bottle 114 in the real-world environment is above or below a maximum or minimum speed, the speed of the animated representation of movement of the siege engine may be respectively set to the maximum or minimum speed, respectively. Further, in some embodiments, movement of a real-world object may not be reflected in the corresponding synthetic image element for movements that are defined as not allowed. For example, the siege engine 122 may not be moved from the original position responsive to moving the bottle 114 if the movement of the bottle 114 would correspond to movement of the siege engine 122 at an unreachable location in the synthetic environment (e.g., if the movement would place the siege engine at a mountain top with no road leading to the top).

Figure 4:
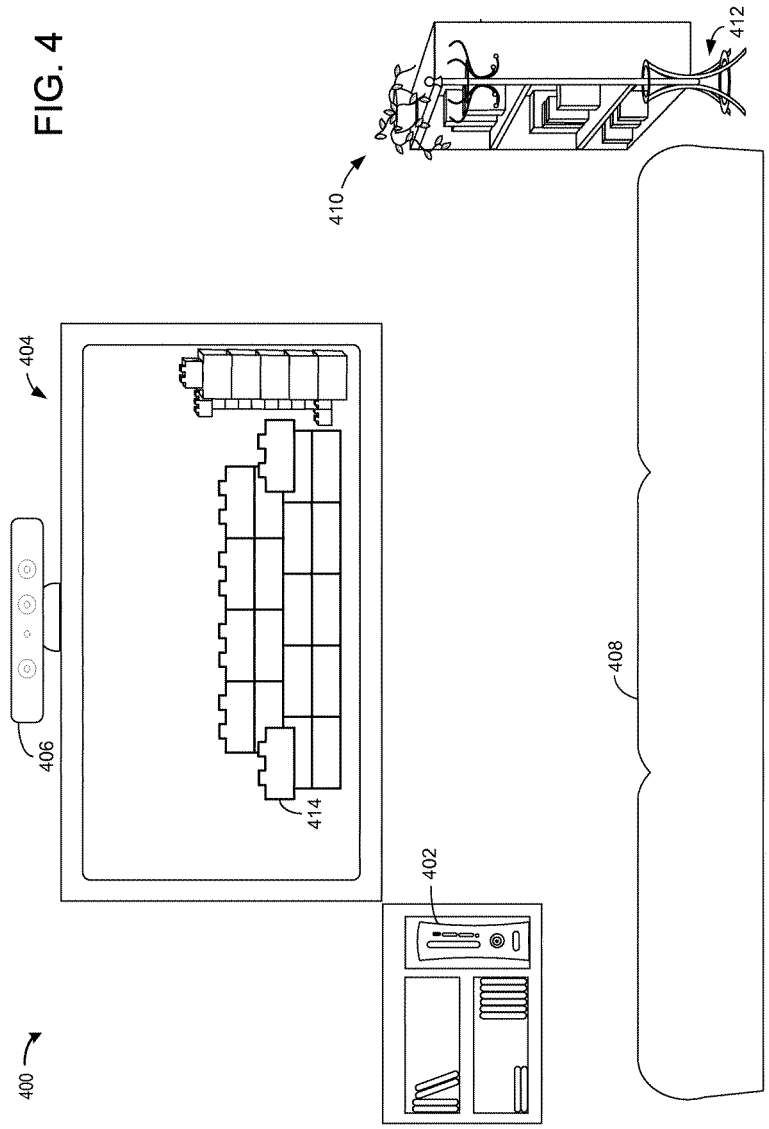
FIG. 4 shows another example of a rendering of a synthetic environmental model in accordance with an embodiment of the present disclosure.

FIG. 4 shows another example embodiment of a rendering of a synthetic environmental model to show representations of real-world objects in an augmented form. Environment 400 includes a computing device 402 providing a displayable output to display device 404. A camera 406 may be communicatively connected to the computing device 402 to provide images of the real-world environment 400 for processing by the computing device 402.

In the example illustrated in FIG. 4, objects such as couch 408, bookcase 410, and coat rack 412 are replaced with similarly-shaped objects formed from synthetic image elements in the form of building blocks. For example, each of the couch, bookcase, and coat rack are represented in the displayable image on the display device 404 as objects that appear to be a collection of building blocks 414 connected to form a shape that is similar to the respective object. In this example, the rules may specify which building blocks (e.g. size, color, shape) to be used for an object based upon rules regarding object size, shape, and/or other suitable factors.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
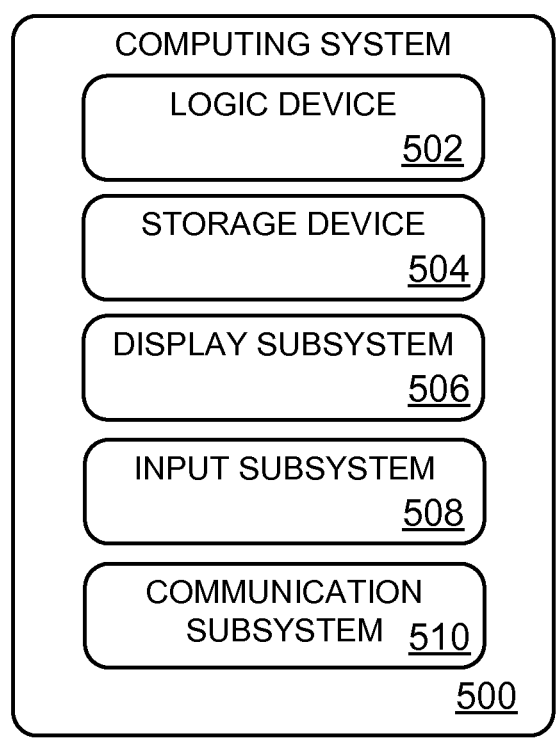
FIG. 5 shows an example of a computing device in accordance with an embodiment of the present disclosure.

FIG. 5 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices, including but not limited to those described in the context of FIGS. 1 and 2.

Computing system 500 includes a logic device 502 and a storage device 504. Computing system 500 may optionally include a display subsystem 506, input subsystem 508, communication subsystem 510, and/or other components not shown in FIG. 5.

Logic device 502 includes one or more physical devices configured to execute instructions. For example, the logic device may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device optionally may be distributed among two or more separate devices, which may be remotely located and/or configured for coordinated processing. Aspects of the logic device may be virtualized and executed by remotely accessible, networked computing devices configured in a cloud-computing configuration.

Storage device 504 includes one or more physical devices configured to hold instructions executable by the logic device to implement the methods and processes described herein. When such methods and processes are implemented, the state of storage device 504 may be transformed—e.g., to hold different data.

Storage device 504 may include removable and/or built-in devices. Storage device 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage device 504 may include volatile, nonvolatile, dynamic, static, read/write, read-only, random-access, sequential-access, location-addressable, file-addressable, and/or content-addressable devices.

It will be appreciated that storage device 504 includes one or more physical devices, and excludes propagating signals per se. However, aspects of the instructions described herein alternatively may be propagated by a communication medium (e.g., an electromagnetic signal, an optical signal, etc.), as opposed to being stored on a storage device.

Aspects of logic device 502 and storage device 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 500 implemented to perform a particular function. In some cases, a program may be instantiated via logic device 502 executing machine-readable instructions held by storage device 504. It will be understood that different modules may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 506 may be used to present a visual representation of data held by storage device 504. This visual representation may take the form of a graphical user interface (GUI). As the herein described methods and processes change the data held by the storage device, and thus transform the state of the storage device, the state of display subsystem 506 may likewise be transformed to visually represent changes in the underlying data. Display subsystem 506 may include one or more display devices utilizing virtually any type of technology. Such display devices may be combined with logic device 502 and/or storage device 504 in a shared enclosure, or such display devices may be peripheral display devices. For example, display subsystem 506 may include display device 104 of FIG. 1.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. For example, communication module 214 of FIG. 2 may communicatively couple computing device 200 to remote service 210 via a network. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a computing device, a method of displaying an image, the method comprising:
   receiving image data of an environment, the image data comprising depth data and other image information capturing real-world topography of the environment;
   detecting a trigger to build a synthetic environmental model based upon the image data of the environment utilizing a three dimensional representation of the environment;
   in response to the trigger, obtaining a set of synthetic image elements for use in constructing the synthetic environmental model;
   for a voxel space in the three-dimensional representation of the environment to be rendered, fitting one or more elements from the set of synthetic image elements to the three dimensional representation of the environment, the one or more elements being fit to the voxel space according to a set of rules to produce the synthetic environmental model, wherein the voxel space comprises a portion of the image data, and wherein fitting the one or more elements from the set of synthetic image elements comprises replacing the other image information of the real-world topography of the voxel space with the one or more elements from the set of synthetic elements;

after replacing the other image information of the real-world topography of the voxel space with the one or more elements from the set of synthetic image elements, rendering the image from the synthetic environmental model for display by rendering the one or more elements from the set of synthetic elements for the voxel space; and outputting the image to a display device.

2. The method of claim 1, wherein the set of synthetic image elements is selected from a plurality of sets of synthetic image elements.

3. The method of claim 2, wherein the set of synthetic image elements is selected via user selection.

4. The method of claim 2, wherein the set of synthetic image elements is selected based on an identity of each of one or more real-world objects to be replaced by one or more elements.

5. The method of claim 1, wherein the synthetic environmental model is utilized to create a game space for a gaming application executed on the computing device.

6. The method of claim 1, wherein the trigger is generated responsive to one or more of a receiving a request from an application, receiving a user input, and detecting a completion of a scanning operation for determining the three dimensional representation of the environment.

7. The method of claim 1, wherein fitting an element to the three dimensional representation comprises performing one or more of a rotation and a scaling of the element.

8. The method of claim 1, further comprising identifying movement of a real-world object and updating the rendered image based on the movement of the real-world object.

9. A computing system, comprising:
a display device;
a camera;
a logic subsystem; and
a storage device configured to hold instructions executable by the logic subsystem to,
receive image data of an environment, the image data comprising depth data and other image information capturing real-world topography of the environment;
detect a trigger to build a synthetic environmental model utilizing a three dimensional representation of an environment;
in response to the trigger, obtain a set of synthetic image elements for use in constructing the synthetic environmental model;
for a voxel space in the three-dimensional representation of the environment to be rendered, fit one or more elements from the set of synthetic image elements to the voxel space according to a set of rules to produce the synthetic environmental model, wherein the voxel space comprises a portion of the image data and wherein fitting the one or more elements from the set of synthetic image elements comprising replacing the other image information of the real-world topography of the voxel space with the one or more elements;

after replacing the other image information of the real-world topography of the voxel space with the one or more elements from the set of synthetic image elements, render an image from the synthetic environmental model for display by rendering the one or more elements from the set of synthetic elements for the voxel space in place of the other image information of the real-world topology of the voxel space; and output the image to a display device.

10. The computing system of claim 9, wherein the camera is a first camera, the computing system further comprising one or more additional cameras, at least one of the additional cameras having a different view than the first camera and capturing different image data from the first camera.

11. The computing system of claim 9, wherein the three dimensional representation of the environment is determined by scanning the environment to acquire image data of the environment from a plurality of perspectives.

12. The computing system of claim 9, wherein the instructions are further executable to receive user input selecting one or more real-world objects in the environment that are replaced with the one or more elements from the set of synthetic image elements.

13. The computing system of claim 9, wherein the three dimensional representation of the environment is received from the remote service via a communications subsystem.

14. The computing system of claim 9, wherein the three dimensional representation of the environment is stored on the storage device.

15. The computing system of claim 9, wherein the instructions are further executable to identify movement of a real-world object based on data received from the camera and to update the rendered image based on the movement of the real-world object.

16. In a computing device, a method of providing an augmented reality experience, the method comprising:
receiving image data of an environment, the image data comprising depth data and other image information capturing real-world topography of the environment;
detecting a trigger to build a synthetic environmental model utilizing a three dimensional representation of an environment;
in response to the trigger, obtaining a set of synthetic image elements for use in constructing the synthetic environmental model;
for a voxel space in the three-dimensional representation of the environment to be rendered, fitting one or more elements from the set of synthetic image elements to the voxel space according to a set of rules to produce the synthetic environmental model, wherein the voxel space comprises a portion of the image data and wherein the one or more elements from the set of synthetic image elements replace the other image information of the real-world topography of the voxel space;
after replacing the other image information of the real-world topography of the voxel space with the one or more elements from the set of synthetic image elements, rendering an image from the synthetic environmental model for display rendering the one or more elements from the set of synthetic elements for the voxel space in place of the other image information of the real-world topology of the voxel space;
outputting the image to a display device;
identifying movement of a selected real-world object based upon the image data of the environment;

updating the image based on the movement of the selected real-world object by moving corresponding synthetic image elements to align with the selected real world object to form an updated image; and outputting the updated image to display device.

17. The method of claim 16, wherein the movement of the real-world object comprises a movement of the selected real-world object.

18. The method of claim 16, wherein updating the rendered view of the image comprises rendering an animation of an adjustment of the position of the plurality of synthetic elements to the updated position, the animation presenting the adjustment from the position of the plurality of synthetic elements to the updated position at a displayed speed based on a predetermined speed defined by the augmented reality experience and an observed speed of the real-world object.

19. The method of claim 16, further comprising tracking camera movement in one or more of six degrees of freedom to determine a location and orientation of the view of the camera.

* * * * *